United States Patent
Sedlacek et al.

(10) Patent No.: US 10,846,202 B2
(45) Date of Patent: Nov. 24, 2020

(54) MULTI-LANGUAGE HEAP ANALYZER

(71) Applicant: Oracle International Corporation, Redwood Shores, CA (US)

(72) Inventors: Jiri Sedlacek, Stara Hut (CZ); Tomas Hurka, Prague (CZ)

(73) Assignee: Oracle International Corporation, Redwood Shores, CA (US)

( * ) Notice: Subject to any disclaimer, the term of this patent is extended or adjusted under 35 U.S.C. 154(b) by 184 days.

(21) Appl. No.: 16/037,933

(22) Filed: Jul. 17, 2018

(65) Prior Publication Data

US 2020/0026637 A1    Jan. 23, 2020

(51) Int. Cl.
| | | |
|---|---|---|
| G06F 11/07 | (2006.01) | |
| G06F 11/36 | (2006.01) | |
| G06F 9/455 | (2018.01) | |
| G06F 8/74 | (2018.01) | |
| G06F 8/51 | (2018.01) | |
| G06F 8/53 | (2018.01) | |

(52) U.S. Cl.
CPC .......... *G06F 11/366* (2013.01); *G06F 9/4552* (2013.01); *G06F 11/3644* (2013.01); *G06F 8/51* (2013.01); *G06F 8/53* (2013.01); *G06F 8/74* (2013.01); *G06F 11/0778* (2013.01)

(58) Field of Classification Search
CPC ............ G06F 11/0778; G06F 11/3636; G06F 11/366; G06F 11/3656; G06F 11/3696; G06F 8/38; G06F 8/40; G06F 8/51; G06F 8/53; G06F 8/73; G06F 8/74; G06F 8/75
See application file for complete search history.

(56) References Cited

U.S. PATENT DOCUMENTS

| | | | |
|---|---|---|---|
| 6,681,385 B1 * | 1/2004 | Steensgaard | G06F 8/75 |
| | | | 707/999.202 |
| 7,162,605 B2 | 1/2007 | Achanta et al. | |
| 8,196,109 B2 | 6/2012 | Fung et al. | |
| 8,566,559 B2 * | 10/2013 | Schmich | G06F 11/3636 |
| | | | 707/813 |
| 8,806,432 B2 * | 8/2014 | Tatsubori | G06F 8/38 |
| | | | 717/115 |
| 9,201,760 B2 * | 12/2015 | Zheng | G06F 11/362 |
| 9,207,920 B2 * | 12/2015 | O'Boyle | G06F 8/427 |
| 9,880,931 B2 | 1/2018 | Seaton et al. | |

(Continued)

OTHER PUBLICATIONS

Vrany, J., "Supporting Multiple Languages in Virtual Machines", a Thesis submitted to the Faculty of Information Technologies, Czech Technical University in Prague, in partial fulfilment of the requirements for the degree of Doctor, Sep. 2010 (121 pages).

(Continued)

*Primary Examiner* — Joseph O Schell
(74) *Attorney, Agent, or Firm* — Ferguson Braswell Fraser Kubasta PC

(57) ABSTRACT

A method for analyzing memory may include obtaining, from a heap snapshot, host objects each represented in a host format for a host language. The host objects may include a first host object and a second host object. The method may further include translating, using a first guest format for a first guest language, the first host object to a first guest object, and translating, using a second guest format for a second guest language, the second host object to a second guest object.

20 Claims, 7 Drawing Sheets

(56) References Cited

U.S. PATENT DOCUMENTS

| | | | |
|---|---|---|---|
| 2005/0283585 A1* | 12/2005 | Sexton | G06F 11/366 |
| | | | 711/171 |
| 2006/0064677 A1 | 3/2006 | Bickson et al. | |
| 2015/0082210 A1* | 3/2015 | Sedlacek | G06F 3/04842 |
| | | | 715/763 |
| 2015/0121348 A1* | 4/2015 | Park | G06F 8/75 |
| | | | 717/131 |
| 2017/0344468 A1* | 11/2017 | Kirshenbaum | G06F 9/5016 |
| 2018/0089434 A1* | 3/2018 | Sibert | H04W 12/08 |
| 2018/0107723 A1* | 4/2018 | Xu | G06F 16/258 |

OTHER PUBLICATIONS

Lee, B.et al., "Debugging Mixed-Environment programs with Blink", Published online in Wiley Online Library (wileyonlinelibrary.com) May 2014 (30 pages).

Daloze, B. et al., "Techniques and Applications for Guest-Language Safepoints", Published in Proceedings of the 10th Workshop on Implementation, Compilation, Optimization of Object-Oriented Languages, Programs and Systems, Prague, Czech Republic, Jul. 6, 2015 (10 pages).

Sundararajan, A. Weblog, "Java Heap Snapshots as a Database?", ORACLE Integrated Cloud Applications & Platform Services; https://blogs.oracle.com/sundararajan/java-heap-snapshot-as-a-database; Jun. 2006 (3 pages).

IBM Developer for z Systems 14.1.x, "Debugging Multilanguage Applications", https://www.ibm.com/support/knowledgecenter/en/SSQ2R2_9.0.1/com.ibm.ent.dbt.zos.doc/topics/eqabug0053.htm; Apr. 2018 (11 pages).

* cited by examiner

MULTI-LANGUAGE HEAP ANALYZER

BACKGROUND

It is challenging to analyze and/or debug the runtime behavior of "polyglot" programs (e.g., a program written using multiple programming languages). Conventional runtime environments lack adequate tools for analyzing the memory usage of such polyglot programs, and are typically limited to supporting programs written in a single language.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method for analyzing memory including obtaining, from a heap snapshot, host objects each represented in a host format for a host language. The host objects include a first host object and a second host object. The method further includes translating, using a first guest format for a first guest language, the first host object to a first guest object, and translating, using a second guest format for a second guest language, the second host object to a second guest object.

In general, in one aspect, one or more embodiments relate to a system for analyzing memory including a repository configured to store a heap snapshot including host objects each represented in a host format for a host language. The host objects include a first host object and a second host object. The system further includes a memory coupled to a processor, and a heap analyzer, executing on the processor and using the memory, configured to translate, using a first guest format for a first guest language, the first host object to a first guest object, and translate, using a second guest format for a second guest language, the second host object to a second guest object.

In general, in one aspect, one or more embodiments relate to a non-transitory computer readable medium including instructions that, when executed by a processor, perform: obtaining, from a heap snapshot, host objects each represented in a host format for a host language. The host objects include a first host object and a second host object. The instructions further perform: translating, using a first guest format for a first guest language, the first host object to a first guest object, and translating, using a second guest format for a second guest language, the second host object to a second guest object.

Other aspects of the invention will be apparent from the following description and the appended claims.

DETAILED DESCRIPTION

Figure 1A:
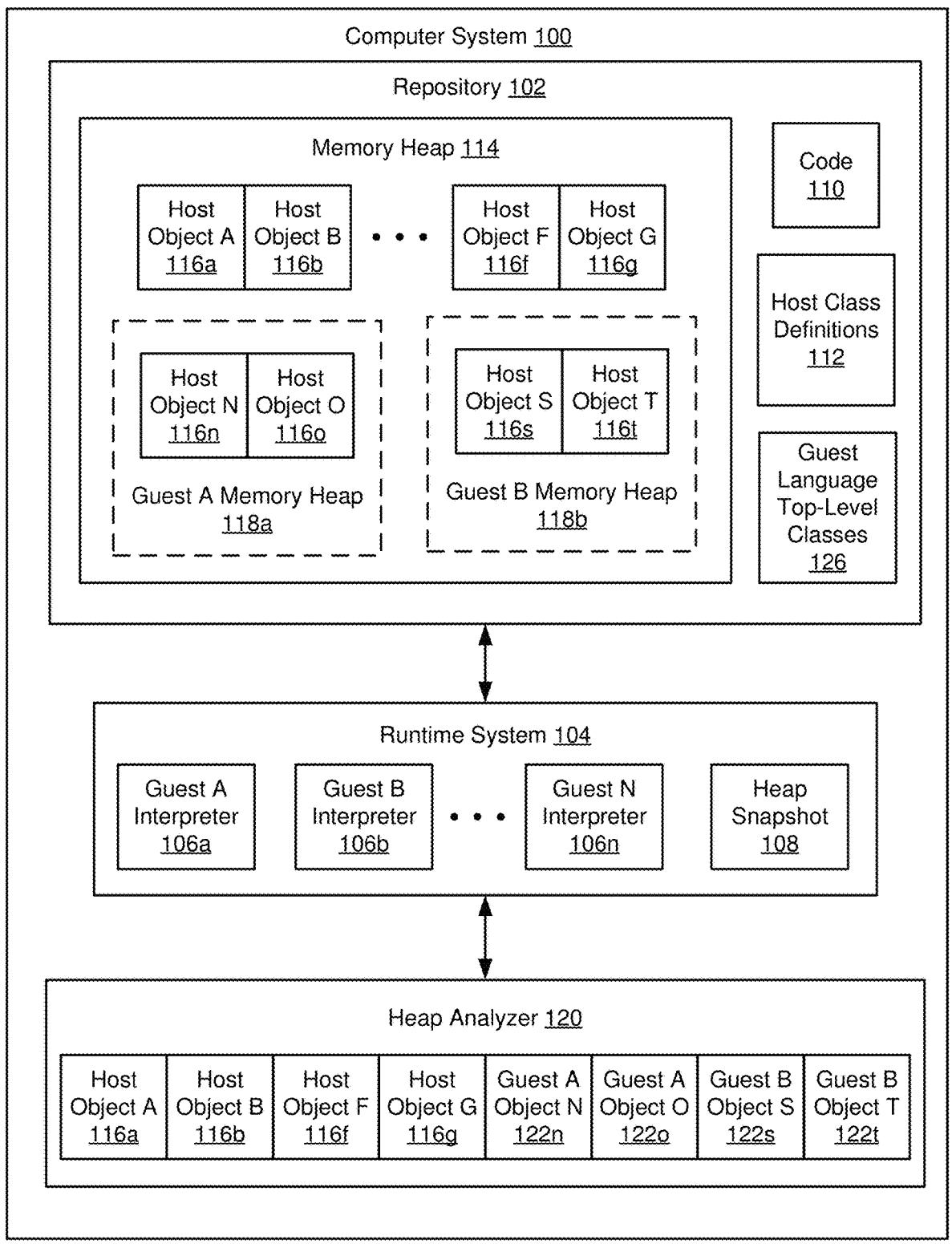
FIG. 1A and FIG. 1B show a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to a method, system, and computer-readable medium for analyzing guest language memory structures in native formats. Guest language classes (e.g., JavaScript classes) may be defined in terms of host classes represented in a host language (e.g., Java) native to a computer system. In one or more embodiments, host objects in a snapshot of a memory heap may be analyzed and presented as guest objects using formats native to guest languages, providing developers with a useful tool for analyzing and debugging code written using one or more guest languages. For example, a developer may view a virtual heap that represents and analyzes the guest objects of a specific guest language. Inter-language references between objects may be represented, for example, where an object represented in one guest language (e.g., JavaScript) refers to an object represented in another guest language (e.g., Python).

FIG. 1A shows a computer system (100) in accordance with one or more embodiments of the invention. As shown in FIG. 1A, the computer system (100) includes a repository (102), a runtime system (104), and a heap analyzer (120). In one or more embodiments, the computer system (100) takes the form of the computing system (500) described with respect to FIG. 5A and the accompanying description below, or takes the form of the client device (526) described with respect to FIG. 5B.

In one or more embodiments, the repository (102) may be any type of storage unit and/or device (e.g., a file system, database, collection of tables, or any other storage mechanism) for storing data. Further, the repository (102) may include multiple different storage units and/or devices. The multiple different storage units and/or devices may or may not be of the same type or located at the same physical site.

In one or more embodiments, the repository (102) includes code (110), host class definitions (112), a memory heap (114), and guest language top-level classes (126). In one or more embodiments, the code (110) is a collection of source code including various software components. The code (110) may be polyglot code that includes a collection of computer instructions written using multiple programming languages. In one or more embodiments, the collection of computer instructions may construct and/or reference various objects.

In one or more embodiments, the host class definitions (112) define classes (e.g., types) from which objects may be instantiated. The host class definitions (112) may be represented in a host language. In one or more embodiments, a host language is a language (e.g., Java) that is natively supported by the computer system (100). For example, the computer system (100) may be implemented using a Java virtual machine or a Java container.

Each host class definition (112) may define a format for the host class that includes one or more elements. The format may define a structure for host objects instantiated from the host class. In one or more embodiments, the elements of the format may include a class name and one or more fields (e.g., properties) each of which may include a reference to an object. In one or more embodiments, the format may indicate a constraint that requires an object referenced in a field to be an instance of a specific host class defined by the host class definitions (112). The host class definitions (112) may include definitions for primitive classes (e.g., integer, float, character, string, Boolean, byte, and other basic data types) as well as classes defined by instructions written in the host language. The host class definitions (112) may be arranged in an inheritance hierarchy, where a subclass may inherit the definition of a parent class (e.g., superclass).

In one or more embodiments, guest language classes are defined using the host class definitions (112). In one or more embodiments, a guest language is a language that is not natively supported by the computer system (100). In one or more embodiments, the guest language top-level classes (126) include, for each guest language, the names of classes in the host class definitions (112) that represent entry points to the corresponding guest language in the host class definitions (112).

Figure 1B:
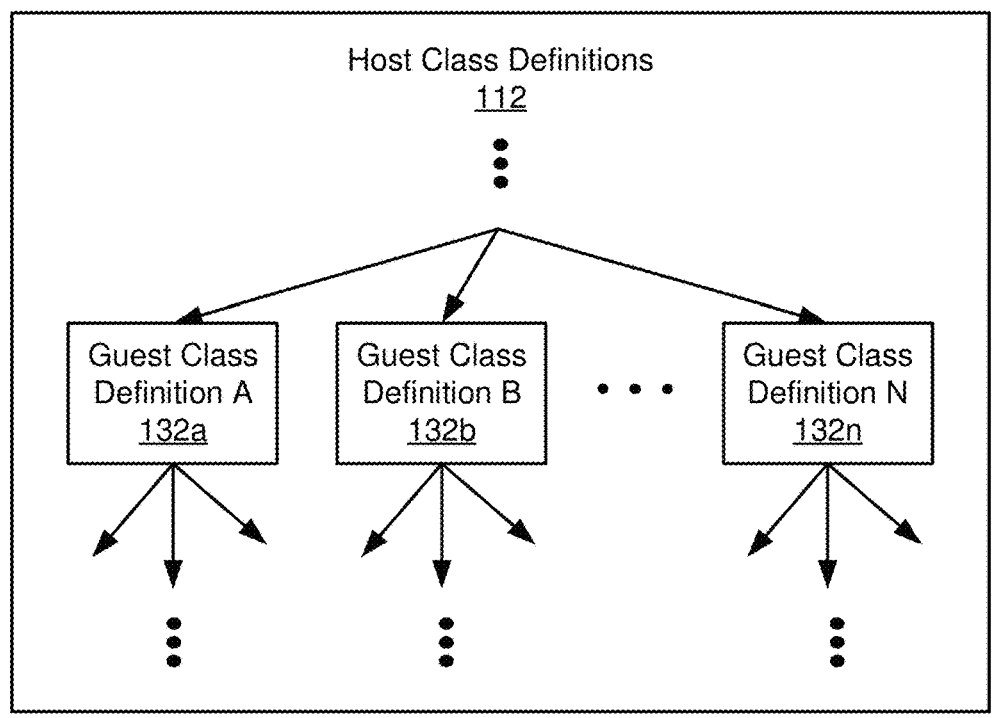
Figure 1B:
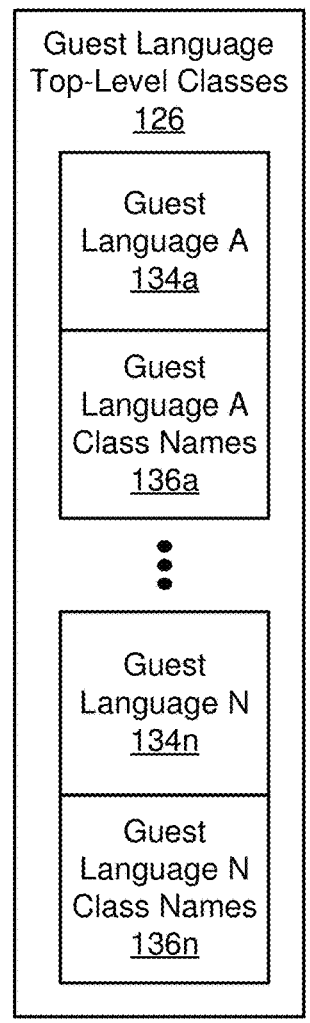

For example, as shown in FIG. 1B, the host class definitions (112) may include definitions of guest language classes (132a, 132b, 132n) used in various guest languages (e.g., JavaScript, Python, etc.). The definitions of guest language classes (132a, 132b, 132n) may describe how to format and/or interpret host objects instantiated from the guest language classes (132a, 132b, 132n) as guest objects in the corresponding guest language. In one or more embodiments, each guest object referenced by a guest language instruction of the code (110) is an instance of a guest language class (132a, 132b, 132n).

As shown in FIG. 1B, in one or more embodiments, the guest language top-level classes (126) include guest language class names (136a, 136n) corresponding to each guest language (134a, 134n). Each guest language class name (136a, 136n) may correspond to a host class defined in the host class definitions (112) that is used to internally represent guest objects for the corresponding guest language (134a, 134n). In one or more embodiments, multiple guest languages (134a, 134n) may share a common set of top-level classes. For example, guest classes for both of the guest languages JavaScript and Ruby may inherit from the Shape and DynamicObject host classes of Java. For example, guest JavaScript and Ruby code may dynamically describe the classes (e.g., types) of objects, where the guest class descriptions may be stored in the host Java memory heap (114) as instances of the Java class Shape. The guest JavaScript and Ruby code may dynamically create objects (e.g., instances) of the guest classes, where the guest objects may be stored in the host Java memory heap (114) as instances of the Java class DynamicObject. In one or more embodiments, subclasses of the Java DynamicObject class may be included as top-level classes that represent entry points to JavaScript and Ruby objects in the Java heap. For example, the class name "DynamicObject" and the names of the subclasses of the Java DynamicObject class may be included in the guest language class names (136a, 136n) for the JavaScript and Ruby guest languages.

As another example, a specific guest language (134n) (e.g., Python) may correspond to a unique top-level class. For example, guest Python code may dynamically instantiate Python objects, where the Python objects may be stored in the host Java memory heap (114) as instances of the Java class PythonObject. The class of the Python object may be defined by the python Class field of the PythonObject object, where other properties of the PythonObject object may be stored in internal data structures of the PythonObject instance. In one or more embodiments, subclasses of the Java PythonObject class may also be top-level classes that represent entry points to Python objects in the Java heap. For example, the class name "PythonObject" and the names of the subclasses of the Java PythonObject class may be included in the guest language class names (136a, 136n) for the Python guest language.

As yet another example, a specific guest language (134n) (e.g., R) may correspond to a unique set of top-level classes. For example, guest R code may dynamically instantiate R objects, where the R guest objects may be stored in the host Java memory heap (114) as instances of the Java classes RBaseObject, RScalarVector, and RForeignWrapper. The class of the R object may be defined by the Java class name of a field of the Java RBaseObject, RScalarVector, or RForeignWrapper class, where other properties of the R object may be stored in complex internal data structures of the R object. In one or more embodiments, subclasses of the Java RBaseObject, RScalarVector, and RForeignWrapper classes may also be top-level classes that represent entry points to R objects in the Java heap. For example, the class names "RBaseObject", "RScalarVector", and "RForeignWrapper" and the names of the subclasses of the Java RBaseObject, RScalarVector, and RForeignWrapper classes may be included in the guest language class names (136a, 136n) for the R guest language.

In one or more embodiments, the guest language classes (132a, 132b, 132n) are dynamically instantiated by the runtime system (104), for example, depending on the execution flow during interpretation of the code (110). In one or more embodiments, each guest language class (132a, 132b, 132n) inherits from a dynamically instantiated class, such as the DynamicObject class in Java. For example, a Java DynamicObject instance may represent a JavaScript or Ruby object whose class (e.g., type) is described by a Java Shape instance referenced by the DynamicObject instance.

In one or more embodiments, a guest object represented in one guest language (e.g., JavaScript) may include an inter-language reference to a guest object represented in another guest language (e.g., Python). Alternatively, a guest object represented in a guest language may include an inter-language reference to a host object represented in the host language (e.g., Java), or vice versa. In one or more embodiments, the implementation of a guest language (e.g., via a guest interpreter (106a)) may reuse some of the host classes defined by the host language. For example, the guest language implementation of a primitive class (e.g., integer, string, etc.) may reuse the host language implementation of the primitive class.

Returning to FIG. 1A, in one or more embodiments, the memory heap (114) may be an area of memory used for dynamic (e.g., runtime) memory allocation, such that blocks of memory may be allocated and freed in an arbitrary order. For example, the memory heap (114) may store objects and arrays dynamically allocated by the code (110). In one or more embodiments, the memory heap (114) is implemented using the non-persistent storage (504) and/or persistent storage (506) of FIG. 5A.

In one or more embodiments, the memory heap (114) includes host objects (116a, 116t). The host objects (116a, 116t) may be instantiated according to host formats defined by the host class definitions (112). In one or more embodiments, a host object (e.g., host object N (116n), host object N (116o), host object N (116s), and host object N (116t)) represents a guest object corresponding to a guest language. In one or more embodiments, the memory heap (114) includes a "virtual" guest heap that includes host objects that represent guest objects using guest formats corresponding to a specific guest language. For example, guest A memory heap (118a) includes host object N (116n) and host object N (116o), which represent guest objects corresponding to guest language A (e.g., JavaScript), and guest B memory heap (118b) includes host object N (116s) and host object N (116t), which represent guest objects corresponding to guest language B (e.g., Python).

Continuing with FIG. 1A, in one or more embodiments, the runtime system (104) may be implemented in hardware (e.g., circuitry), software, firmware, and/or any combination thereof. In one or more embodiments, the runtime system (104) is a virtual machine. A virtual machine is a software implementation of a computing device executing on an underlying computing device (e.g., computer system (100)). A virtual machine may abstract the operating system and hardware of the underlying computing device from instructions that are executed in the virtual machine.

The runtime system (104) may execute the code (110) and provide various support services during execution, including managing the memory heap (114). In one or more embodiments, the runtime system (104) includes functionality to save the contents of the memory heap (114) as a heap snapshot (108). For example, the heap snapshot (108) may be an .hprof snapshot of a host Java memory heap. The heap snapshot (108) may include information regarding the host objects instantiated from host classes in the host class definitions (112). The host objects in the heap snapshot (108) may be represented according to host formats defined by host classes in the host class definitions (112). The heap snapshot (108) may include the size of and/or the number of host objects in the memory heap (114), as well as other information typically included in a heap dump. For example, the heap snapshot (108) may include a listing of host objects that would be removed during garbage collection (e.g., based on analyzing which objects dominate other objects).

In one or more embodiments, the heap snapshot (108) may include memory usage information for a specific host class. For example, the heap snapshot (108) may include information regarding the amount of memory consumed by all host objects that are instances of a specific host class.

In one or more embodiments, the runtime system (104) includes guest interpreters (106a, 106n), thereby supporting the interpretation of multiple guest languages in a single execution environment. In one or more embodiments, the runtime system (104) may execute instructions written in multiple guest languages in a single process of the computer system (100).

In one or more embodiments, guest interpreters (106a, 106n) include functionality to transform guest language instructions of the code (110) into an intermediate representation (e.g., Java bytecode) used by the computer system (100). The guest interpreters (106a, 106n) may include functionality to execute the intermediate representation. Alternatively, a guest interpreter (106a) may include functionality to directly execute guest language instructions of the code (110). Still alternatively, a guest interpreter (106a) may include functionality to execute previously compiled guest language instructions of the code (110). Each guest interpreter (106a, 106n) may interpret instructions written in a specific guest programming language (e.g., JavaScript, Python, etc.). The guest interpreters (106a, 106n) may be implemented using a host programming language (e.g., Java) that is natively supported by the computer system (100). For example, a guest interpreter (106a) may use the host class definitions (112) while interpreting guest language instructions of the code (110).

In one or more embodiments, a guest interpreter (106a) may be a compiler that transforms the code (110) into machine code. The compiler may be a computer program designed to transform source code written in a programming language, or intermediate representation, into machine code that is capable of being executed in a virtual machine. In one or more embodiments, the compiler includes functionality to translate an intermediate representation of the program into machine code that the virtual machine is configured to execute. For example, the compiler may include functionality to create machine code that, when executed in lieu of direct execution of an intermediate representation, improves the execution speed of the code (110). In one or more embodiments of the invention, the compiler includes functionality to perform dynamic compilation of operations or functions as the program is executing (e.g., just-in-time (JIT) compilation.

In one or more embodiments, the heap analyzer (120) may be implemented in hardware (e.g., circuitry), software, firmware, and/or any combination thereof. In one or more embodiments, the heap analyzer (120) runs in a separate, standalone process of the computer system (100). The heap analyzer (120) may include functionality to present (e.g., display) the heap snapshot (108) using a display device. The display device may include a graphical user interface (GUI) operatively connected to the heap analyzer (120). The GUI may include functionality to receive input from a user and present information to the user via the display device, generally through graphical, text, audio, and/or any other input/output representations.

The heap analyzer (120) may include functionality to present information regarding a host object (e.g., host object N (116a), host object N (116b), host object N (116f), and host object N (116g)) using a host format defined by a host class. The heap analyzer (120) may include functionality to present information regarding a guest object (e.g., guest A object N (122n), guest A object N (122o), guest B object N (122s), and guest B object N (122t)) using a guest format defined by a guest class. The heap analyzer (120) may include functionality to translate a host object to a guest object, and vice versa. The heap analyzer (120) may include functionality to extract a guest format from the implementation details of a guest language, as represented in the host class definitions (112) and the guest language top-level classes (126).

In one or more embodiments, the heap analyzer (120) may include functionality to extract, from the heap snapshot (108), memory usage information for each guest language. For example, the heap analyzer (120) may extract, from the heap snapshot (108), information regarding the amount of memory consumed by all host objects that represent guest objects for a specific guest language. The heap analyzer (120) may include functionality to extract top-level guest classes for a guest language from the guest language top-level classes (126). In one or more embodiments, the heap analyzer (120) may include functionality to perform one or more of the following operations: searching the objects in the heap snapshot (108) (e.g., by values, strings, fields, etc.), scripted analysis (e.g., using object query language (OQL), scripting languages, etc.), and visualization of data structures (e.g., elements of a collection, previews of generated web pages, etc.).

While FIG. 1A and FIG. 1B show configurations of components, other configurations may be used without departing from the scope of the invention. For example, various components may be combined to create a single component. As another example, the functionality performed by a single component may be performed by two or more components.

Figure 2:
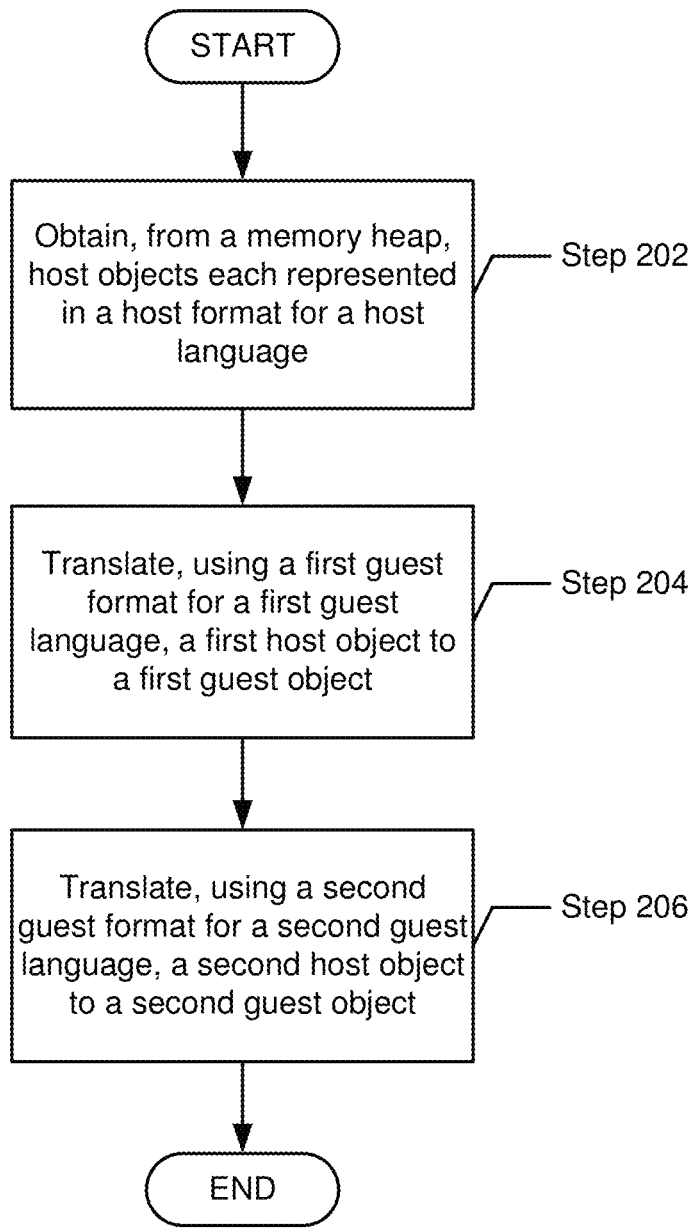
FIG. 2, FIG. 3A, and FIG. 3B show flowcharts in accordance with one or more embodiments of the invention.

FIG. 2 shows a flowchart in accordance with one or more embodiments of the invention. The flowchart depicts a process for analyzing memory. One or more of the steps in FIG. 2 may be performed by the components (e.g., the heap analyzer (120) of the computer system (100)), discussed above in reference to FIG. 1A. In one or more embodiments of the invention, one or more of the steps shown in FIG. 2 may be omitted, repeated, and/or performed in parallel, or in a different order than the order shown in FIG. 2. Accordingly, the scope of the invention should not be considered limited to the specific arrangement of steps shown in FIG. 2.

Initially, in Step 202, host objects are obtained from a memory heap generated by the runtime system by executing the code. In one or more embodiments, the host objects may be obtained from a heap snapshot corresponding to the contents of the memory heap at a point in time. Each host object may be represented using a host format for a host language. The host format may be defined by a host class from which the host object is instantiated. The memory heap may be generated as a result of allocating, modifying and/or de-allocating host objects during the execution of the code. The code may be executed using one or more guest interpreters corresponding to the guest language(s) used in the instructions of the code.

In Step 204, a first host object is translated to a first guest object using a first guest format for a first guest language. In one or more embodiments, the heap analyzer performs the translation based on determining that the first host object is an instance of a host class that defines a guest class of the first guest language. The heap analyzer may determine that the host class defines a guest class by examining (e.g., searching) the contents of the guest language top-level classes. For example, the heap analyzer may determine that the host class inherits from a top-level guest class C of a guest language, based on identifying an entry in the guest language top-level classes indicating that class C is a top-level guest class for the guest language.

For example, the heap analyzer may search for instances of the host Java DynamicObject class in the heap snapshot which represent guest JavaScript and Ruby objects. Each DynamicObject instance may include a reference to a Shape instance that describes the layout of fields, class name, and other details shared by all objects instantiated from the same class. Thus, the Java DynamicObject class may be a top-level class that represents the entry point to JavaScript and Ruby objects in the Java heap.

As another example, the heap analyzer may search for instances of the host Java PythonObject class in the heap snapshot which represent guest Python objects and describe the layout of fields, class name, and other details of the Python object. Thus, the Java PythonObject class may be a top-level class that represents the entry point to Python objects in the Java heap.

As yet another example, the heap analyzer may search for instances of the host Java RBaseObject, RScalarVector, and RForeignWrapper classes in the heap snapshot which represent guest R objects and describe the class, layout of fields and other details of the R object. Thus, the Java RBaseObject, RScalarVector, and RForeignWrapper classes may be top-level classes that represents the entry points to R objects in the Java heap.

In one or more embodiments, the first guest format is extracted from the definition of the guest class. The first guest object may be a new host object instantiated in accordance with the guest format, that includes the contents of the first host object. For example, the first guest format may be used to determine the class name and the names of the fields of the first guest object.

In Step 206, a second host object is translated to a second guest object using a second guest format for a second guest language (see description of Step 204 above).

Figure 3A:
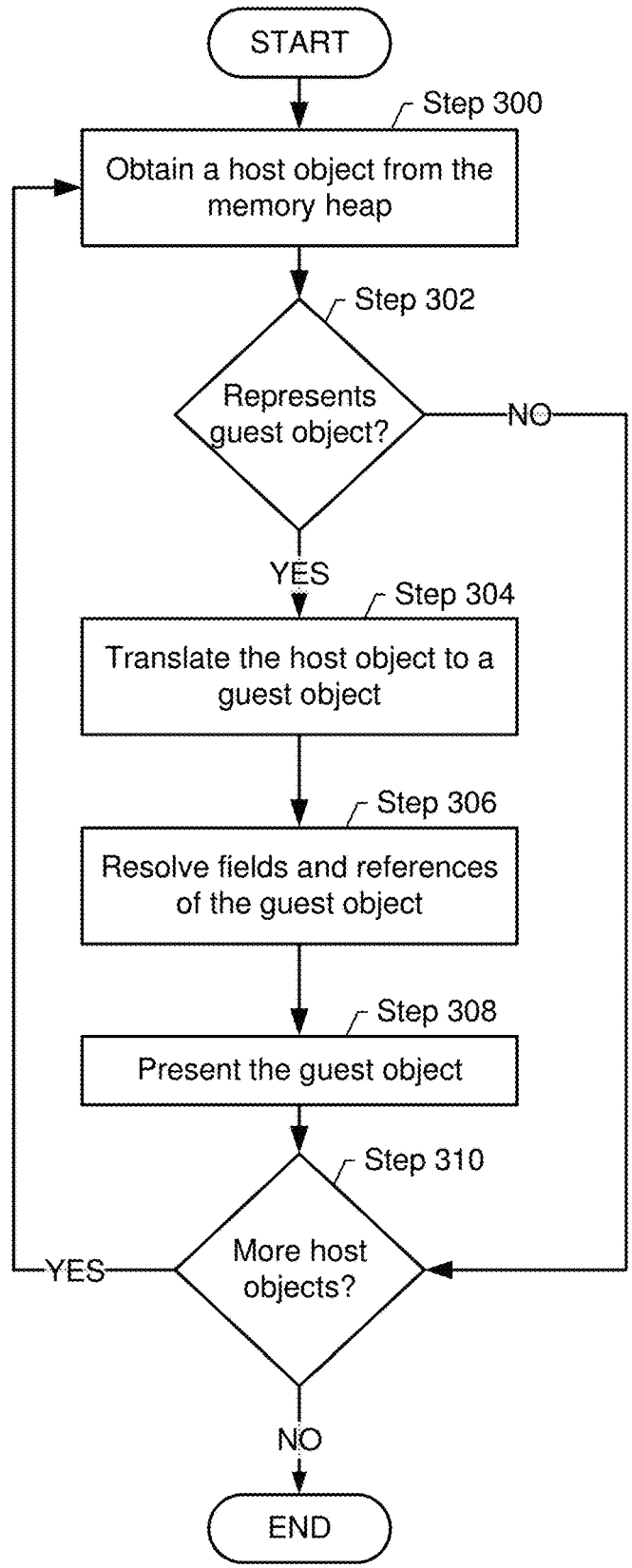

FIG. 3A shows a flowchart in accordance with one or more embodiments of the invention. The flowchart depicts a process for translating host objects to guest objects. Moreover, the flowchart in FIG. 3A may correspond to Step 204 and Step 206 in FIG. 2. One or more of the steps in FIG. 3A may be performed by the components (e.g., the heap analyzer (120) of the computer system (100)), discussed above in reference to FIG. 1A. In one or more embodiments of the invention, one or more of the steps shown in FIG. 3A may be omitted, repeated, and/or performed in parallel, or in a different order than the order shown in FIG. 3A. Accordingly, the scope of the invention should not be considered limited to the specific arrangement of steps shown in FIG. 3A.

Initially, in Step 300, a host object is obtained from the memory heap (see description of Step 202 above). In one or more embodiments, various host objects in the memory heap may be obtained in subsequent iterations of Step 300. For example, the obtained host object may be a target of a field or reference whose translation to a guest object was initiated in a previous iteration of Step 306 below.

If, in Step 302, it is determined that the obtained host object (i.e., the host object obtained in Step 300 above) represents a guest object, then execution continues with Step 304 below. In one or more embodiments, the obtained host object represents a guest object when the obtained host object is an instance of a host class that defines a guest class of a guest language (see description of Step 204 above).

Otherwise, if it is determined that the obtained host object does not represent a guest object, then execution continues with Step 310 below.

In Step 304, the obtained host object is translated to a guest object using a guest format defined by the guest class (see description of Step 204 above).

In Step 306, fields and references of the guest object are resolved (see description of FIG. 3B below).

In Step 308, the guest object is presented. The heap analyzer presents the guest object according to the guest format. In one or more embodiments, the guest class name and the names of the fields of the guest object may be presented by the heap analyzer. For example, the heap analyzer may display, at the request of a developer, the detailed structure of one or more guest objects selected via a user interface of the heap analyzer. In one or more embodiments, the heap analyzer presents the guest objects of a guest language separately from the guest objects of other guest languages. For example, the heap analyzer may display the guest objects of each guest language in a separate window or tab of a graphical user interface (GUI).

If the guest object includes a reference to a guest object (e.g., that was added in Step 306 above), then the reference may be presented in the heap analyzer. The guest object reference may include a tag designating the guest language corresponding to the referenced guest object (e.g., to display a visual cue in a GUI that alerts the developer to references to guest objects).

In one or more embodiments, the heap analyzer may identify a guest class whose instances (e.g., guest objects instantiated from the guest class) consume a disproportionately large amount of memory relative to the amount of memory consumed by the instances of other guest classes. In one or more embodiments, the heap analyzer may identify a potential memory usage flaw (e.g., a memory leak) in the code based on the disproportionately large amount of memory consumed by the guest class. The heap analyzer may present an alert (e.g., displayed via a GUI) regarding the potential memory usage flaw that describes the memory consumed by the instances of the guest class.

If, it is determined in Step 310 that there are additional host objects in the memory heap to process, then successive iterations of Step 300 above are executed for the additional host objects. In one or more embodiments, the host objects obtained in successive iterations of Step 300 may correspond to guest objects of a specific guest language. For example, the host objects obtained in successive iterations of Step 300 may be instantiated from one or more guest classes for the specific guest language, as defined in the host class definitions (see description of Step 302 above).

Figure 3B:
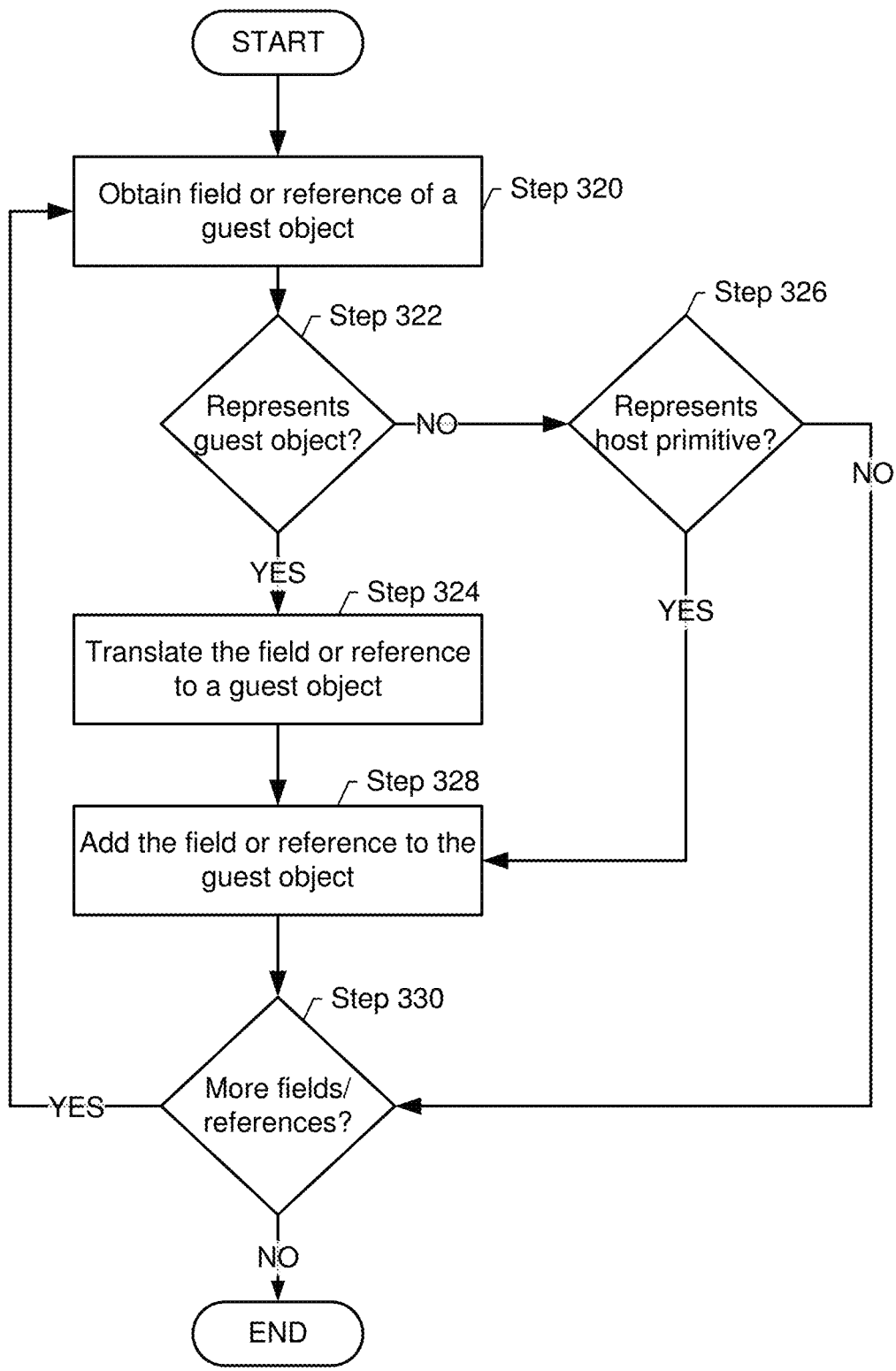

FIG. 3B shows a flowchart in accordance with one or more embodiments of the invention. The flowchart depicts a process for translating host objects to guest objects. Moreover, the flowchart in FIG. 3B may correspond to Step 306 in FIG. 3A. One or more of the steps in FIG. 3B may be performed by the components (e.g., the heap analyzer (120) of the computer system (100)), discussed above in reference to FIG. 1A. In one or more embodiments of the invention, one or more of the steps shown in FIG. 3B may be omitted, repeated, and/or performed in parallel, or in a different order than the order shown in FIG. 3B. Accordingly, the scope of the invention should not be considered limited to the specific arrangement of steps shown in FIG. 3B.

Initially, in Step 320, a field or reference of a guest object is obtained (see description of Step 306 above).

If, in Step 322, it is determined that the field or reference represents a guest object, then execution continues with Step 324 below. In one or more embodiments, the field or reference represents a guest object when the referenced object is a host object that is an instance of a guest class (see description of Step 302 above).

Otherwise, if it is determined that the field or reference does not represent a guest object, then execution continues with Step 326 below.

In Step 324, the field or reference is translated to a new guest object by recursively invoking the process described by FIG. 3A (e.g., starting with Step 300 above). The reference to the translated guest object may be an inter-language reference, where an object represented in one language references an object represented in a second language. In this manner, host objects in the memory heap may be translated to guest objects, as the host objects are recursively traversed.

If, in Step 326, it is determined that the field or reference represents an object instantiated from a primitive class of the host language, then execution continues with Step 328 below, to add the reference to the host primitive object. For example, a host primitive object may be a numerical, string, Boolean, or byte value, etc.

Otherwise, if it is determined that the field or reference does not represent a host primitive object, then execution continues with Step 330 below.

In Step 328, the reference is added to the referencing guest object (i.e., the guest object obtained in Step 320 above).

If, it is determined in Step 330 that there are additional fields or references in the guest object to process, then successive iterations of Step 320 above are executed to resolve the additional fields or references.

Figure 4:
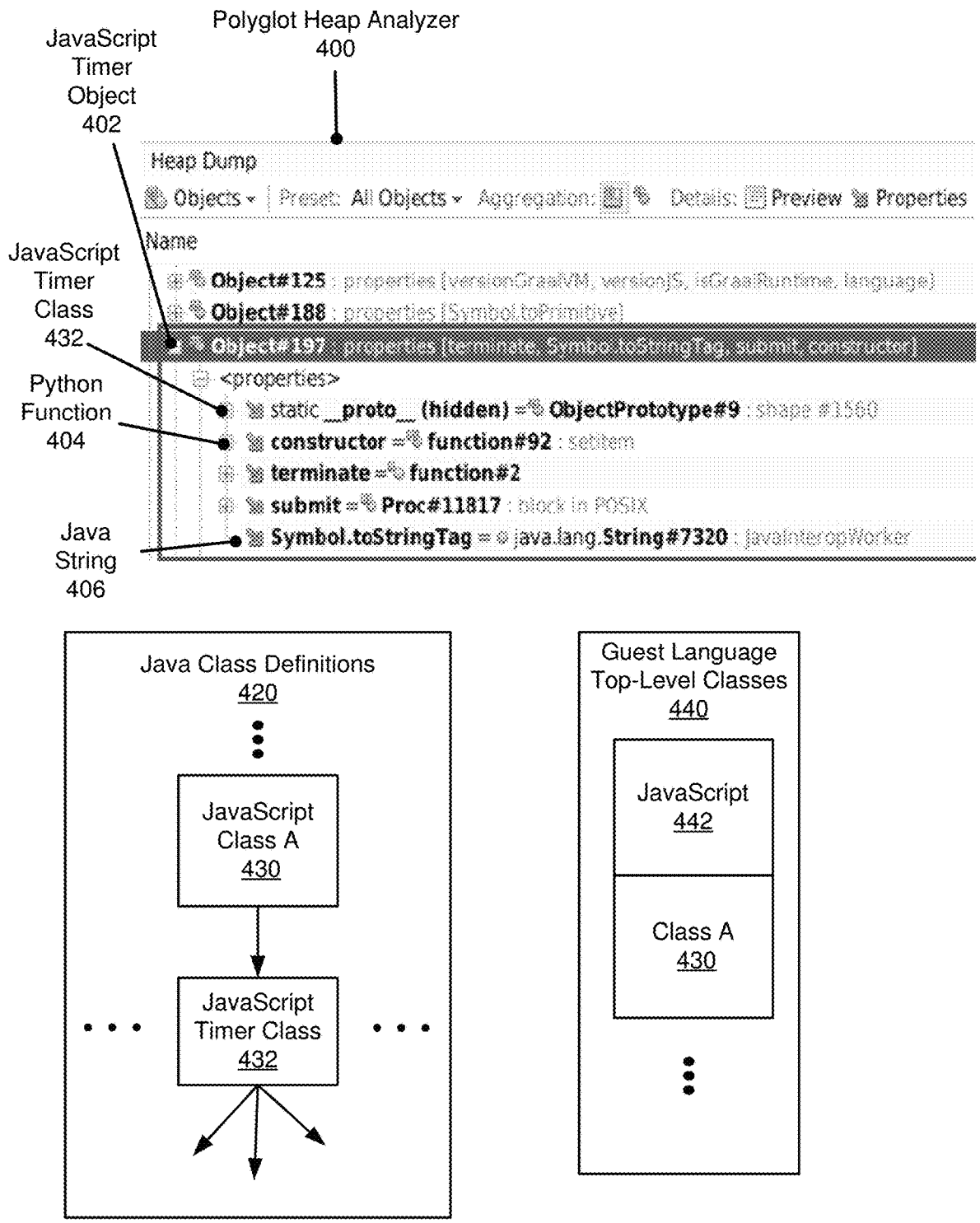
FIG. 4 shows an example in accordance with one or more embodiments of the invention.

The following example is for explanatory purposes only and not intended to limit the scope of the invention. In FIG. 4, the host language of the computer system is Java. FIG. 4 shows a polyglot heap analyzer (400) ((120) in FIG. 1A) that displays information regarding host objects in a heap snapshot generated by the runtime system. The code is polyglot code written using multiple guest languages, including JavaScript, Python, R, and Ruby. Each of the guest languages has a corresponding guest language interpreter that executes instructions written in the guest language.

To display information regarding a Java object in the heap, the polyglot heap analyzer (400) determines whether the Java object represents a guest object corresponding to one of the guest languages. FIG. 4 illustrates the display of a Java object as a guest object, namely a JavaScript Timer object (402). The polyglot heap analyzer (400) first determines that the JavaScript Timer object (402) is an instance of the JavaScript Timer class (432). Next, the heap analyzer (400) determines that the JavaScript Timer class (432) is a subclass of class A (430) (e.g., the Java DynamicObject class), as shown in the Java class definitions (420) ((112) in FIG. 1A and FIG. 1B) of FIG. 4. Next, the heap analyzer (400) consults the guest language top-level classes (440) ((126) in FIG. 1A and FIG. 1B) which indicates that class A (430) is a top-level class for JavaScript (442).

The polyglot heap analyzer (400) then displays the JavaScript Timer object (402) according to the format defined by the JavaScript Timer class (432). The polyglot heap analyzer (400) adds, to the display of the JavaScript Timer object (402), a reference to the JavaScript Timer class (432).

The JavaScript Timer class (432) defines a series of properties (e.g., fields): constructor, terminate, submit, and symbol.toStringTag. According to the definition of the JavaScript Timer class (432), the constructor property refers to a Python function. The polyglot heap analyzer (400) then translates the Java object representing the value of the constructor property to the Python function (404) that implements the constructor. In addition, the polyglot heap analyzer (400) presents an inter-language reference to the Python function (404) when displaying the JavaScript Timer object (402), as illustrated in FIG. 4. The inter-language reference to the Python function (404) is tagged with an icon designating the Python language.

According to the definition of the JavaScript Timer class (432), the symbol.toStringTag property refers to a Java string (406). The polyglot heap analyzer (400) determines that the Java object representing the value of the symbol.toStringTag property represents a host primitive object that does not require translation. The polyglot heap analyzer (400) then presents an inter-language reference to the Java string (406) when displaying the JavaScript Timer object (402), as illustrated in FIG. 4. The inter-language reference to the Java string (406) is tagged with an icon designating the Java language.

Figure 5A:
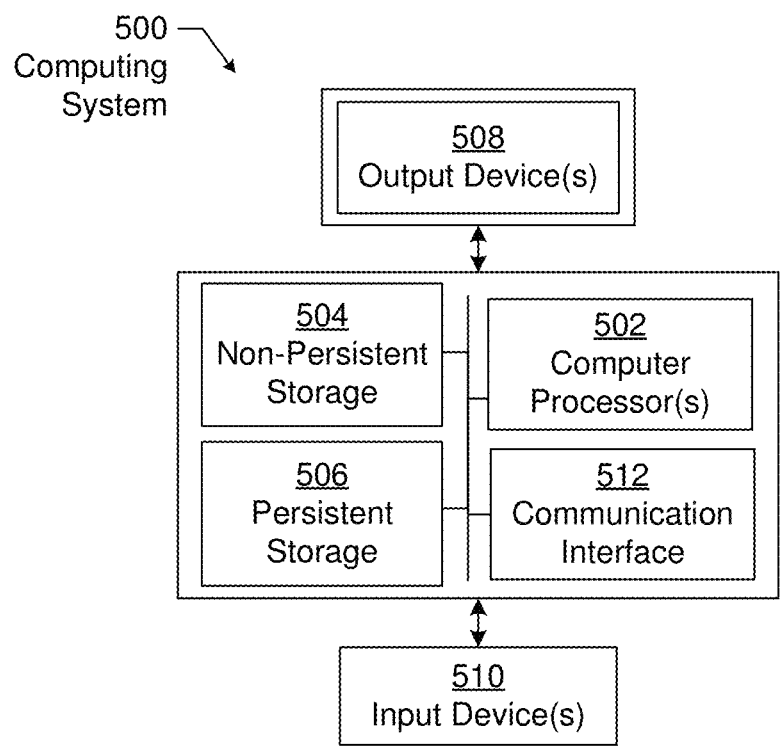
FIG. 5A and FIG. 5B show computing systems in accordance with one or more embodiments of the invention.

Embodiments disclosed herein may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

Figure 5B:
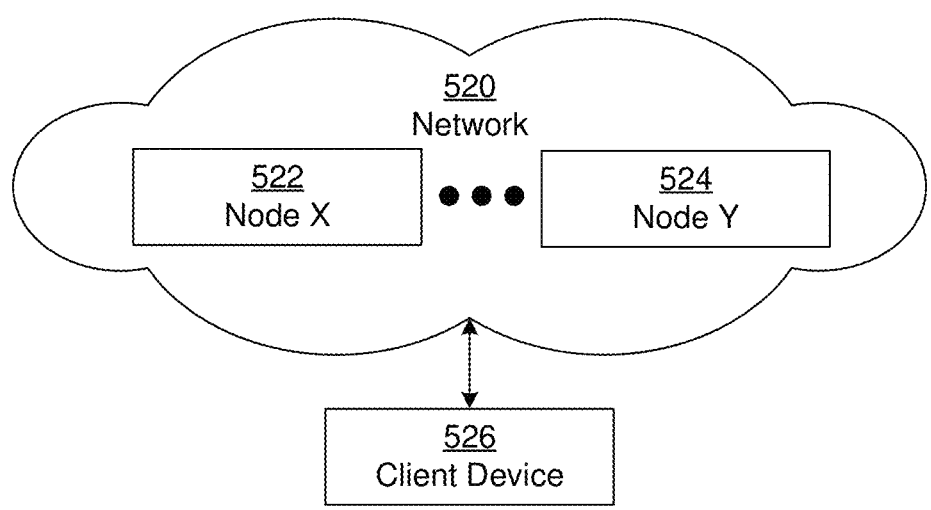

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments disclosed herein may be implemented on a node of a distributed system that is connected to other nodes. By way of another example, embodiments disclosed herein may be implemented on a distributed computing system having multiple nodes, where each portion disclosed herein may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments disclosed herein.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions presents only a few examples of functions performed by the computing system of FIG. 5A and the nodes and/or client device in FIG. 5B. Other functions may be performed using one or more embodiments disclosed herein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for analyzing memory, comprising:
obtaining, from a heap snapshot, a plurality of host objects each represented in a host format for a host language, wherein the plurality of host objects comprises a first host object and a second host object;
translating, using a first guest format for a first guest language, the first host object to a first guest object; and
translating, using a second guest format for a second guest language, the second host object to a second guest object.

2. The method of claim 1, further comprising:
presenting the first guest object according to the first guest format and the second guest object according to the second guest format.

3. The method of claim 1, wherein the second host object is translated in response to determining that the first host object comprises a reference to the second host object.

4. The method of claim 3, further comprising:
adding, to the first guest object, a reference to the second guest object.

5. The method of claim 1, wherein translating the first host object to the first guest object comprises:
determining that the first host object is an instance of a first host class that defines a guest class of the first guest language; and
extracting the first guest format from the guest class.

6. The method of claim 1, further comprising:
extracting first memory usage information from a first subset of the plurality of host objects corresponding to the first guest language; and
extracting second memory usage information from a second subset of the plurality of host objects corresponding to the second guest language.

7. The method of claim 1, further comprising:
searching the plurality of host objects corresponding to the first guest language;
analyzing, using a script, the plurality of host objects corresponding to the first guest language; and
displaying a data structure comprised by the plurality of host objects corresponding to the first guest language.

8. A system for analyzing memory, comprising:
a repository configured to store:
a heap snapshot comprising a plurality of host objects each represented in a host format for a host language, wherein the plurality of host objects comprises a first host object and a second host object;
a memory coupled to a processor; and
a heap analyzer, executing on the processor and using the memory, configured to:
translate, using a first guest format for a first guest language, the first host object to a first guest object; and
translate, using a second guest format for a second guest language, the second host object to a second guest object.

9. The system of claim 8, further comprising:
a display device configured to present the first guest object according to the first guest format and the second guest object according to the second guest format.

10. The system of claim 8, wherein the heap analyzer is further configured to translate the second host object in response to determining that the first host object comprises a reference to the second host object.

11. The system of claim 10, wherein the heap analyzer is further configured to add, to the first guest object, a reference to the second guest object.

12. The system of claim 8, wherein the heap analyzer is further configured to translate the first host object to the first guest object by:

determining that the first host object is an instance of a first host class that defines a guest class of the first guest language; and extracting the first guest format from the guest class.

13. The system of claim 8, wherein the heap analyzer is further configured to:

extract first memory usage information from a first subset of the plurality of host objects corresponding to the first guest language; and extract second memory usage information from a second subset of the plurality of host objects corresponding to the second guest language.

14. A non-transitory computer readable medium comprising instructions that, when executed by a processor, perform:

obtaining, from a heap snapshot, a plurality of host objects each represented in a host format for a host language, wherein the plurality of host objects comprises a first host object and a second host object;

translating, using a first guest format for a first guest language, the first host object to a first guest object; and translating, using a second guest format for a second guest language, the second host object to a second guest object.

15. The non-transitory computer readable medium of claim 14, further comprising instructions that perform:

presenting the first guest object according to the first guest format and the second guest object according to the second guest format.

16. The non-transitory computer readable medium of claim 14, wherein the second host object is translated in response to determining that the first host object comprises a reference to the second host object.

17. The non-transitory computer readable medium of claim 16, further comprising instructions that perform:

adding, to the first guest object, a reference to the second guest object.

18. The non-transitory computer readable medium of claim 14, wherein translating the first host object to the first guest object comprises:

determining that the first host object is an instance of a first host class that defines a guest class of the first guest language; and extracting the first guest format from the guest class.

19. The non-transitory computer readable medium of claim 14, further comprising instructions that perform:

extracting first memory usage information from a first subset of the plurality of host objects corresponding to the first guest language; and extracting second memory usage information from a second subset of the plurality of host objects corresponding to the second guest language.

20. The non-transitory computer readable medium of claim 14, further comprising instructions that perform:

searching the plurality of host objects corresponding to the first guest language;

analyzing, using a script, the plurality of host objects corresponding to the first guest language; and displaying a data structure comprised by the plurality of host objects corresponding to the first guest language.

* * * * *